United States Patent
Son et al.

(10) Patent No.: US 12,131,596 B2
(45) Date of Patent: Oct. 29, 2024

(54) STEERING DEVICE FOR DETECTING ERROR OF ROAD WHEEL ACTUATOR AND METHOD OF DETERMINING ERROR OF ROAD WHEEL ACTUATOR

(71) Applicant: HL MANDO CORPORATION, Pyeongtaek-si (KR)

(72) Inventors: Myungseob Son, Seoul (KR); Hyunsik Han, Suwon-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 443 days.

(21) Appl. No.: 17/501,665

(22) Filed: Oct. 14, 2021

(65) Prior Publication Data
US 2022/0122386 A1    Apr. 21, 2022

(30) Foreign Application Priority Data
Oct. 16, 2020 (KR) .................. 10-2020-0134409

(51) Int. Cl.
*G06F 17/00* (2019.01)
*B62D 5/04* (2006.01)
*G07C 5/08* (2006.01)

(52) U.S. Cl.
CPC ......... *G07C 5/0825* (2013.01); *B62D 5/0481* (2013.01); *B62D 5/0463* (2013.01)

(58) Field of Classification Search
CPC .. G07C 5/0825; B62D 5/0481; B62D 5/0463; B62D 5/0424; B62D 5/0448; B62D 5/0421; G01M 17/06
USPC ........................................................ 701/34
See application file for complete search history.

(56) References Cited

U.S. PATENT DOCUMENTS 5,563,790 A * 10/1996 Wada ................... B62D 5/0487
                                                                701/41
10,864,940 B2 * 12/2020 Naik ..................... B62D 6/008
11,192,576 B2 * 12/2021 Ushiro ................ B62D 5/0481
(Continued)

FOREIGN PATENT DOCUMENTS

DE     10 2008 021 849 A1    11/2009
KR         10-2132770 B1       7/2020

OTHER PUBLICATIONS

What Are the Possible Causes of EPS Malfunction? Know Here (Year: 2023).*

(Continued)

*Primary Examiner* — Ronnie M Mancho
(74) *Attorney, Agent, or Firm* — Hauptman Ham, LLP

(57) ABSTRACT

A steering device for detecting an error of a road wheel actuator according to an exemplary embodiment of the present disclosure includes an electronic control unit and a road wheel actuator. The electronic control unit may be electrically connected with a steering wheel of a vehicle, and the road wheel actuator may be electrically connected with the electronic control unit. When the vehicle starts, the electronic control unit may rotate the steering wheel in one direction or an opposite direction to the one direction by driving the road wheel actuator and measure data of the road wheel actuator. A method of determining an error of a road wheel actuator according to another exemplary embodiment of the present disclosure includes a first operation, a second operation, and a third operation.

7 Claims, 6 Drawing Sheets

(56) References Cited

U.S. PATENT DOCUMENTS

| | | | |
|---|---|---|---|
| 11,685,432 B2* | 6/2023 | Suzuki | B62D 5/0484 |
| | | | 701/41 |
| 2018/0234039 A1* | 8/2018 | Kuwahara | B62D 5/0463 |
| 2020/0070872 A1 | 3/2020 | Ushiro et al. | |
| 2020/0114961 A1* | 4/2020 | Suzuki | B60Q 9/00 |
| 2020/0180685 A1* | 6/2020 | Suzuki | B62D 5/0412 |
| 2021/0018063 A1* | 1/2021 | Noborikawa | D03D 15/573 |
| 2021/0053612 A1* | 2/2021 | Kondo | B62D 5/0424 |

OTHER PUBLICATIONS

Office Action issued on Dec. 6, 2023, for corresponding German Patent Application No. 10 2021 211 400.8, along with English machine translation (13 pages).

* cited by examiner

STEERING DEVICE FOR DETECTING ERROR OF ROAD WHEEL ACTUATOR AND METHOD OF DETERMINING ERROR OF ROAD WHEEL ACTUATOR

CROSS-REFERENCE TO RELATED APPLICATIONS

This application claims benefit and priority to Korean Patent Application No. 10-2020-0134409, filed on Oct. 16, 2020, with the Korean Intellectual Property Office, the disclosure of which is incorporated herein in its entirety by reference.

TECHNICAL FIELD

The present disclosure relates to a steering device, and more particularly, to a steering device for detecting an error of a road wheel actuator, in which an electronic control unit measures data of a road wheel actuator by driving the road wheel actuator when a vehicle starts and detects an error of the road wheel actuator, and a method of determining an error of the road wheel actuator.

BACKGROUND

In general, power steering has been developed and applied to a steering device of a vehicle in order to provide convenience in driving by assisting driver's operating force of a steering wheel, and for the power steering, a hydraulic type using hydraulic pressure, an electro-hydraulic type using hydraulic pressure and electric power of a motor at the same time, an electric type using only electric power of a motor, and the like have been developed and applied.

Recently, a Steer By Wire (SBW)-type steering device in which a mechanical connection device, such as a steering column, a universal joint, or a pinion shaft, is removed between a steering wheel and a wheel and steering of a vehicle is performed by using an electric motor, such as a motor, has been developed and applied.

The SBW type steering device has no mechanical connection between a steering shaft and a wheel, so that there is a problem in that the sense of weight due to friction and jamming of the wheels on the road surface is not transmitted to a driver, so that the steering feel is reduced. Accordingly, the SBW-related disclosure in the related art is mainly made for improving the steering feel of a driver.

However, the SBW steering device is driven by a Road Wheel Actuator (RWA), and depending on a driving environment, there may occur a problem in that rust occurs in a road wheel actuator or the steering is impossible due to the skip of a belt that is a component.

PRIOR ART LITERATURE

Patent Document (Patent Document 1) Korean Patent No. 2132770 (published on Jul. 13, 2020)

SUMMARY

The present disclosure has been made in an effort to provide a steering device for detecting an error of a road wheel actuator, in which when a vehicle starts, an electronic control unit measures data of a road wheel actuator by driving the road wheel actuator and rotating a steering wheel in one direction and/or an opposite direction to the one direction, and detects an error of the road wheel actuator, and a method of determining an error of the road wheel actuator.

However, the object to be solved by the present disclosure is not limited to the purposes, and may be variously expanded in the range without departing from the spirt and the area of the present disclosure.

In order to solve the object to be solved by the present disclosure, an exemplary embodiment of the present disclosure provides a steering device for detecting an error of a road wheel actuator in which when a vehicle starts, an electronic control unit measures motor torque data and/or motor rotation number data of a road wheel actuator and checks an error of the road wheel actuator, and a method of determining an error of the road wheel actuator.

An exemplary embodiment of the present disclosure provides a steering device for detecting an error of a road wheel actuator, the steering device including: an electronic control unit and a road wheel actuator. The electronic control unit may be electrically connected with a steering wheel of a vehicle, and the road wheel actuator may be electrically connected with the electronic control unit. When the vehicle starts, the electronic control unit may rotate the steering wheel in one direction or an opposite direction to the one direction by driving the road wheel actuator and measure data of the road wheel actuator.

According to an exemplary embodiment, the data of the road wheel actuator may be motor torque data. The electronic control unit may measure the motor torque data and compare the measured motor torque data and input reference motor torque data.

According to the exemplary embodiment, the steering device for detecting the error of the road wheel actuator further includes a display unit. When the motor torque data is larger than the reference motor torque data by a predetermined size or more, the electronic control unit may display an error of the road wheel actuator on the display unit.

According to the exemplary embodiment, the road wheel actuator includes an electric assembly and a sensor assembly. The error of the road wheel actuator displayed on the display unit indicates that rust is generated in the electric assembly and the sensor assembly.

According to the exemplary embodiment, the data of the road wheel actuator may be motor rotation number data. The electronic control unit may measure the motor rotation number data, and compare the measured motor rotation number data and input reference motor rotation number data.

According to the exemplary embodiment, when the motor rotation number data is larger than the reference motor rotation number data by a predetermined rotation number or more, the electronic control unit may display an error of the road wheel actuator on the display unit.

According to the exemplary embodiment, the error of the road wheel actuator displayed on the display unit indicates that a belt of the electric assembly is skipped.

Another exemplary embodiment of the present disclosure provides a method of determining an error of a road wheel actuator, the method including a first operation, a second operation, and a third operation. In the first operation, when a vehicle starts, an electronic control unit rotates a steering wheel in one direction or an opposite direction to the one direction by driving a road wheel actuator. In the second operation, the electronic control unit measures data of the road wheel actuator and detects an error of the road wheel actuator. In the third operation, when the error occurs in the road wheel actuator, the electronic control unit displays the error of the road wheel actuator on a display unit.

According to the exemplary embodiment, in the second operation, the data of the road wheel actuator may be motor torque data. The electronic control unit may measure the motor torque data and compares the measured motor torque data and input reference motor torque data, and when the motor torque data is larger than the reference motor torque data by a predetermined size or more, the electronic control unit may detect that the road wheel actuator has an error.

According to the exemplary embodiment, in the third operation, the road wheel actuator may include an electric assembly and a sensor assembly. The error of the road wheel actuator displayed on the display unit indicates that rust is generated in the electric assembly and the sensor assembly.

According to the exemplary embodiment, in the second operation, the data of the road wheel actuator may be motor rotation number data. The electronic control unit may measure the motor rotation number data, and compare the measured motor rotation number data and input reference motor rotation number data, and when the motor rotation number data is larger than the reference motor rotation number data by a predetermined rotation number or more, the electronic control unit may detect that the road wheel actuator has an error.

According to the exemplary embodiment, in the third operation, the road wheel actuator may include an electric assembly. The error of the road wheel actuator displayed on the display unit indicates that a belt of the electric assembly is skipped.

The steering device for detecting the error of the road wheel actuator and the method of determining an error of the road wheel actuator according to the exemplary embodiments of the present disclosure may detect an error of the road wheel actuator, that is, whether rust is generated in the road wheel actuator and whether a belt is skipped.

The steering device for detecting the error of the road wheel actuator and the method of determining an error of the road wheel actuator according to the exemplary embodiments of the present disclosure may detect the error of the road wheel actuator before the steering of a vehicle is impossible, thereby minimizing human and material damage that may occur due to inability to steer.

However, the effect of the present disclosure is not limited to the foregoing effects, and may be variously expanded in the range without departing from the spirt and the area of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described in more detail with reference to the accompanying drawings. Among the constituent elements of the present disclosure, specific descriptions of the constituent element which can be clearly understood by those skilled in the art by the prior art will be omitted so as not to obscure the gist of the present disclosure.

Hereinafter, a steering device for detecting an error of a road wheel actuator according to exemplary embodiments of the present disclosure and a method of determining an error of the road wheel actuator will be described.

Figure 1:
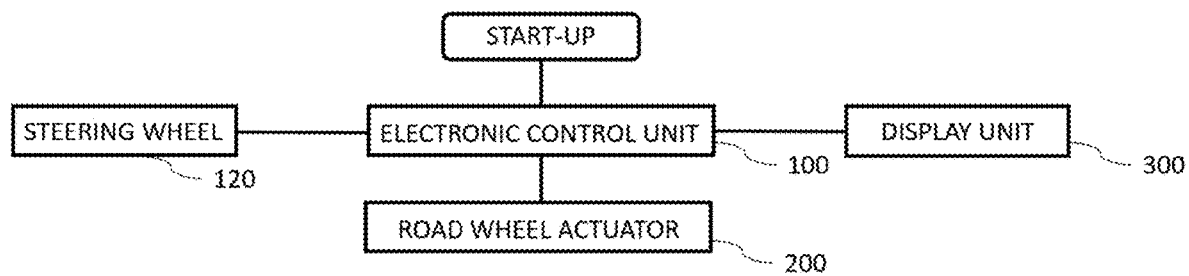
FIG. 1 is a block diagram illustrating a configuration of a steering device for detecting an error of a road wheel actuator according to an exemplary embodiment of the present disclosure.
Figure 2:
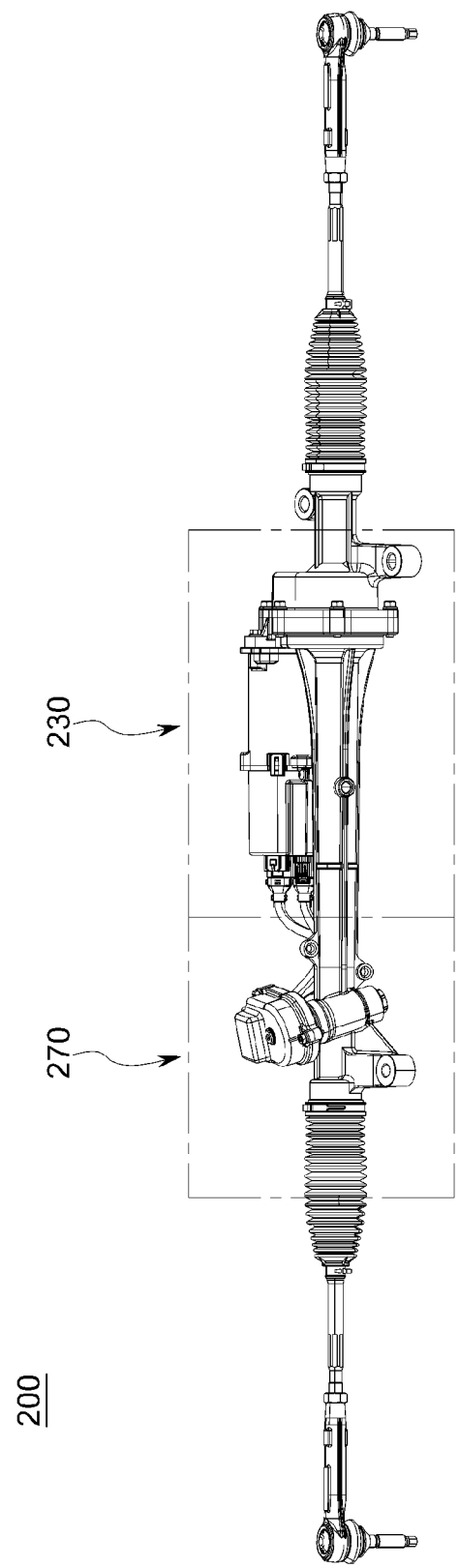
FIG. 2 is a diagram illustrating the road wheel actuator of FIG. 1.
Figure 3:
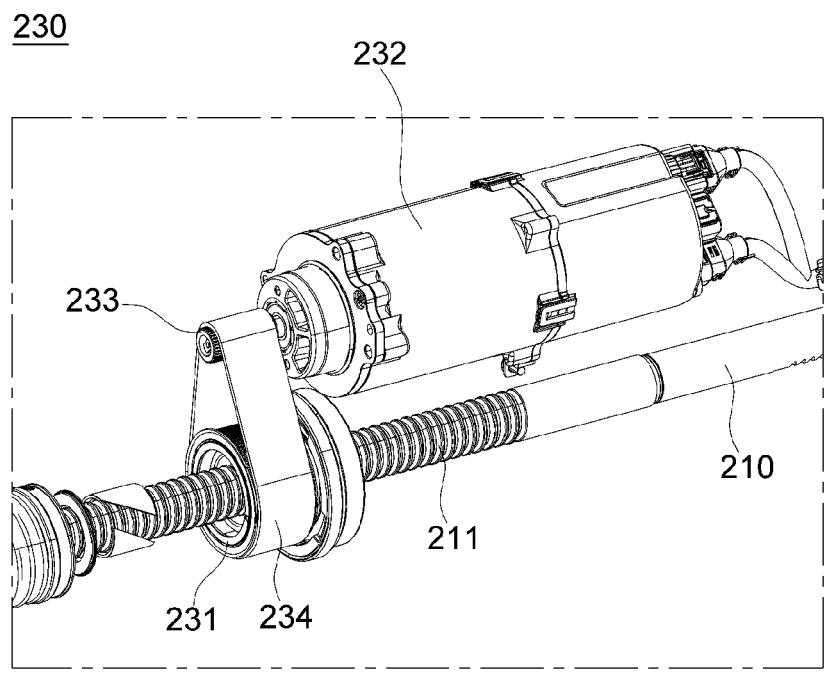
FIG. 3 is a diagram illustrating an electric assembly of FIG. 2.
Figure 4:
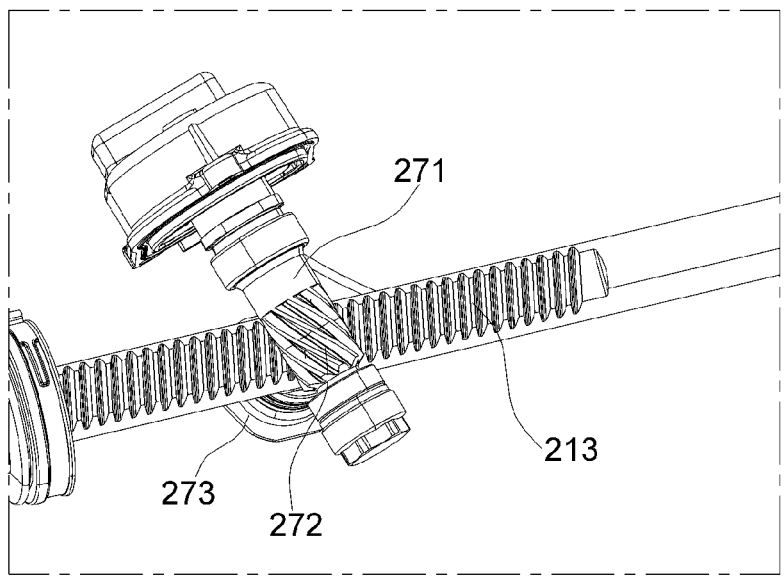
FIG. 4 is a diagram illustrating a sensor assembly of FIG. 2.

FIG. 1 is a block diagram illustrating a configuration of a steering device for detecting an error of a road wheel actuator 200 according to an exemplary embodiment of the present disclosure, FIG. 2 is a diagram illustrating the road wheel actuator of FIG. 1, FIG. 3 is a diagram illustrating an electric assembly of FIG. 2, and FIG. 4 is a diagram illustrating a sensor assembly of FIG. 2.

Referring to FIGS. 1 to 4, the steering device for detecting an error of the road wheel actuator 200 according to the exemplary embodiment of the present disclosure includes an electronic control unit 100 and the Road Wheel Actuator (RWA) 200.

The electronic control unit 100 may be electrically connected with a steering wheel 120 of a vehicle, and also may be electrically connected with the road wheel actuator 200.

Although not illustrated in FIG. 1, the electronic control unit 100 may include an input device, a storage device, an information processing device, and an output device.

The input device may receive motor torque data, reference motor torque data, motor rotation number data, and reference motor rotation number data of the road wheel actuator 200 which will be described below, and the storage device may store the foregoing data.

The information processing device may compare and analyze the data by using input and stored software. In particular, according to the exemplary embodiments of the present disclosure, the electronic control unit 100 may measure the motor torque data and compare the motor torque data with input reference motor torque data. Further, when the motor torque data is larger than the reference motor torque data by a predetermined size or more (that is, when a difference between the motor torque data and the reference motor torque data is equal to or larger than the predetermined size), the electronic control unit 100 may display an error of the road wheel actuator 200 on a display unit 300, which is to be described below, by using an output device. This is identically applied to the case where the electronic control unit 100 measures the motor rotation number data.

The road wheel actuator 200 includes a rack bar 210, an electric assembly 230, and a sensor assembly 270.

The rack bar 210 may include a screw grove 211 and a rack gear 213.

The screw groove 211 may be formed on an outer circumferential surface of the rack bar 210 in a predetermined length and may be connected with the electric assembly 230.

The rack gear 213 may be spaced apart from the screw groove 211 by a predetermined distance, and may be formed in a predetermined length at one side of the outer circumferential surface of the rack bar 210. The rack gear 213 may be connected with the sensor assembly 270.

The electronic control unit 100 may be electrically connected with the electric assembly 230 and the sensor assembly 270.

The electric assembly 230 may include a ball-nut 231, a motor 232, and a belt 234.

The ball-nut 231 may be engaged with the screw groove 211 formed in the rack bar 210 via a ball.

The motor 232 may be spaced apart from the rack bar 210 by a predetermined gap and disposed in a housing surrounding the rack bar 210.

The belt 234 may connect the motor 232 and the ball-nut 231. In particular, the belt 234 may be disposed in a pulley 233 disposed in a rotation shaft of the motor 232 and a nut pulley coupled to the outer circumferential surface of the ball-nut 231 and connect the pulley 233 and the nut pulley, thereby connecting the motor 232 and the ball-nut 231.

When the rotation shaft of the motor 232 rotates in one direction or an opposite direction to the one direction, the ball-nut 231 rotates through the belt 234 and the ball disposed inside the ball-nut 231 flows in the screw groove 211 formed in the rack bar 210. Accordingly, the rack bar 210 may move to the left or right.

The sensor assembly 270 may include a pinion shaft 271.

The pinion shaft 271 may be formed with a pinion gear 272 which is engaged with the rack gear 213 formed in the rack bar 210.

The sensor assembly 270 may further include a supporting member 273 which is capable of supporting the rack bar 210 moving to the left or right.

The sensor assembly 270 may support the rack bar 210 so as to prevent the rack bar 210 from being tilted when the motor 232 of the electric assembly 230 is driven and the rack bar 210 moves.

The electronic control unit 100 may also detect torque generated between the pinion shaft 271 of the sensor assembly 270 and the rack bar 210.

Depending on a use environment of the road wheel actuator 200, rust may be generated inside the electric assembly 230 and/or the sensor assembly 270. The rust generated in the electric assembly 230 and/or the sensor assembly 270 may disable steering of the vehicle.

In particular, in the electric assembly 230, rust may be generated between the rotation shaft of the motor 232 and the pulley 233, between the ball-nut 231 and the nut pulley, between the ball inside the ball-nut 231 and the screw groove 211, and in various bearings.

In the sensor assembly 270, rust may be generated between the pinion gear 272 formed in the pinion shaft 271 and the rack gear 213 formed in the rack bar 210, and in various bearings.

The rust generated in the ball of the ball-nut 231, the screw groove 211, the pinion gear 272, the rack gear 213, and various bearings may act as resistance to the rotation of the ball of the ball-nut 231 and the ball-nut 231 and the rotation of the pinion gear 272.

The rotation resistance of the ball-nut 231 and the rotation resistance of the pinion gear 272 may cause the increase in the torque of the motor 232. Herein, the torque of the motor 232 means a load applied to the rotation shaft when the rotation shaft of the motor 232 rotates. When the rotation resistance of the ball-nut 231 and the rotation resistance of the pinion gear 272 increase, the load applied to the rotation shaft of the motor 232 increases, which means the increase in the torque of the motor 232.

Accordingly, when the data of the road wheel actuator 200 is measured, it is possible to detect an error of the road wheel actuator 200. Herein, the data of the road wheel actuator 200 may be the motor torque data representing the torque of the motor 232.

In the steering device for detecting the error of the road wheel actuator 200 according to the exemplary embodiments of the present disclosure, when the vehicle starts, the electronic control unit 100 may rotate the steering wheel in one direction or an opposite direction to the one direction by driving the road wheel actuator 200, and in this case, the electronic control unit 100 may measure data of the road wheel actuator 200.

In particular, when the vehicle starts, the electronic control unit 100 may drive the motor 232 of the road wheel actuator 200 by using input and stored software, and measure motor torque data that is the load applied to the rotation shaft of the motor 232.

The method of measuring, by the electronic control unit 100, the motor torque data may be the method of measuring the load applied to the rotation shaft of the motor 232 by mounting a torque sensor to the motor 232.

Further, depending on an exemplary embodiment, the electronic control unit 100 may detect torque generated between the pinion shaft 271 of the sensor assembly 270 and the rack bar 210 and estimate rack force, and measure motor torque data by using the rack force.

By comparing the change trend of the motor torque data, it is possible to know an error of the road wheel actuator 200, that is, whether rust is generated in the road wheel actuator 200. Particular exemplary embodiments thereof are illustrated in FIGS. 5 to 8.

Figure 5:
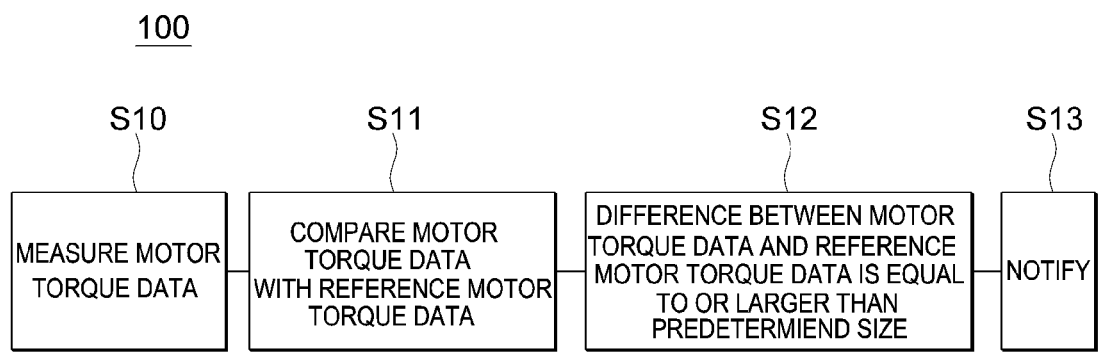
FIG. 5 is a diagram illustrating a flow of measuring, by an electronic control unit, motor torque data and detecting an error of the road wheel actuator.
Figure 6:
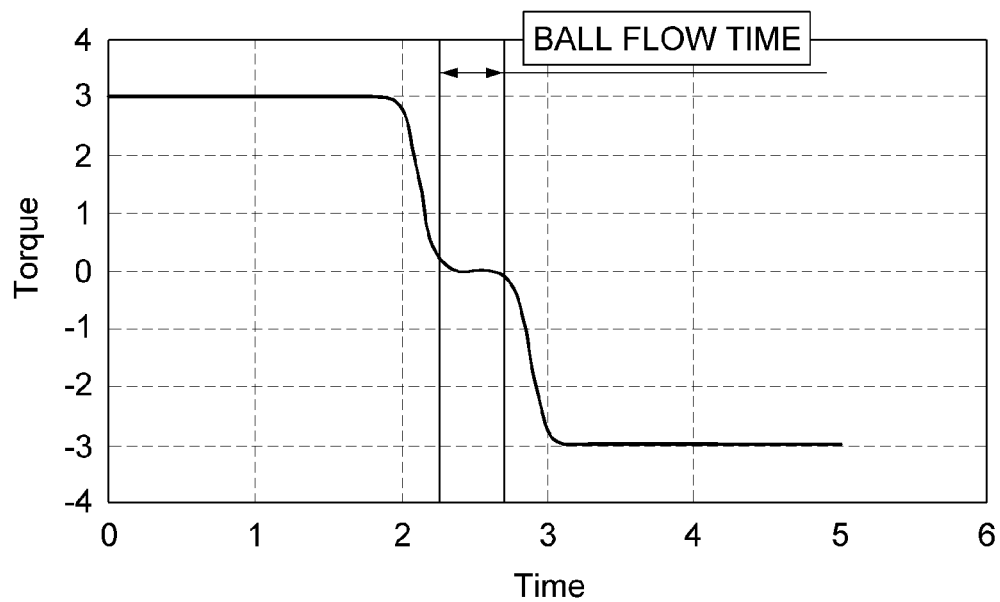
FIGS. 6 and 7 are diagrams illustrating motor torque data over time.
Figure 7:
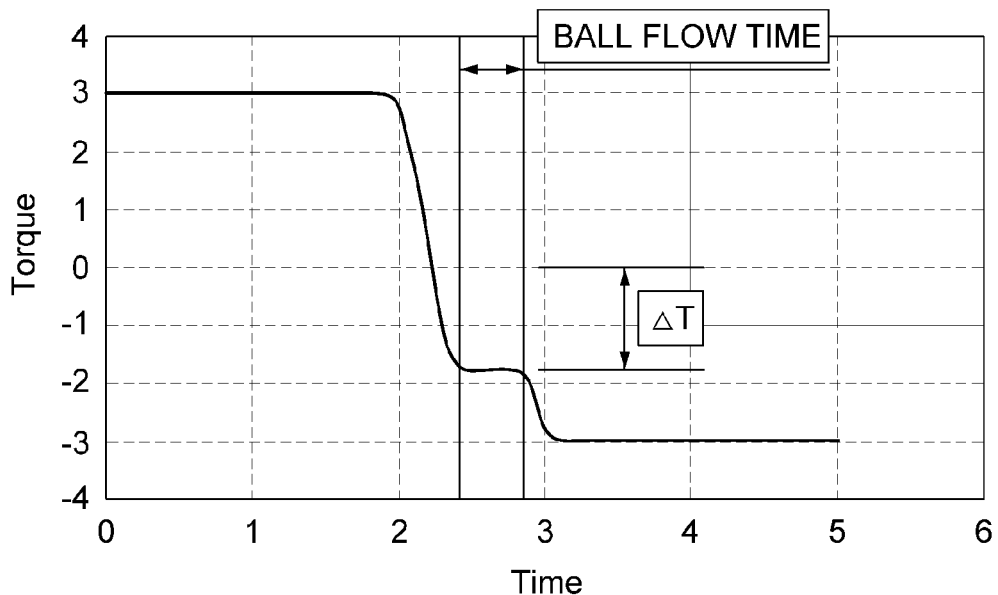
Figure 8:
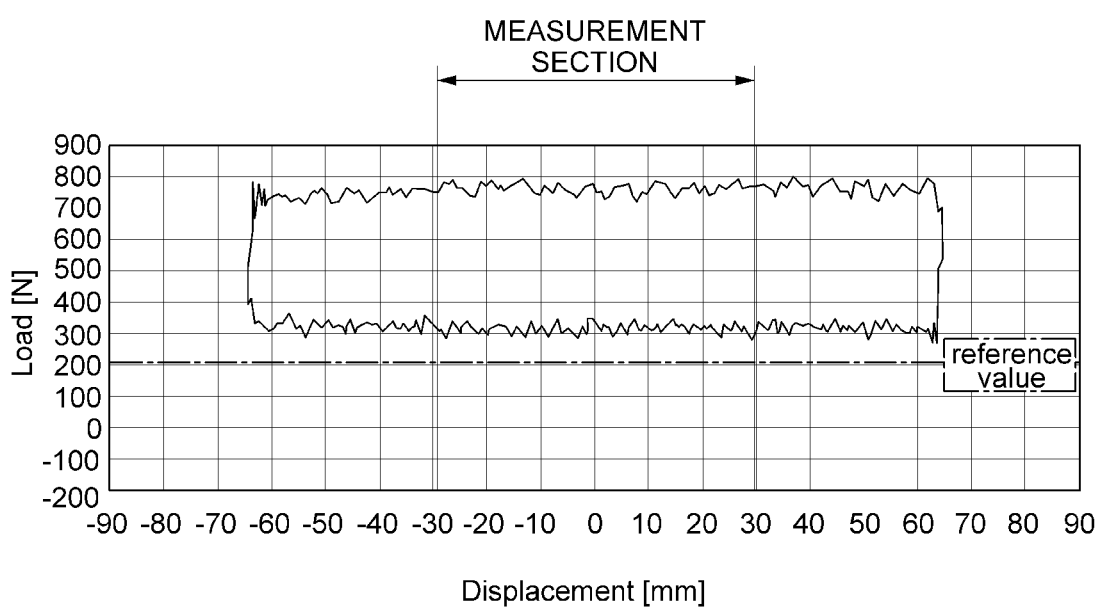
FIG. 8 is a diagram illustrating motor torque data according to a displacement.

FIG. 5 is a diagram illustrating a flow of measuring, by the electronic control unit, motor torque data and detecting an error of the road wheel actuator, FIGS. 6 and 7 are diagrams illustrating motor torque data over time, and FIG. 8 is a diagram illustrating motor torque data according to a displacement.

Referring to FIG. 5, the electronic control unit 100 may measure motor torque data (S10), and compare the measured motor torque data with input and stored reference motor torque data (S11), and when the motor torque data is larger than the reference motor torque data by a predetermined size or more (S12) (that is, when a difference between the motor torque data and the reference motor torque data is equal to or larger than a predetermined size or more), the electronic control unit 100 may display an error of the road wheel actuator 200 (S13). Herein, the predetermined size may be arbitrarily set by a user. In particular, the user may set the predetermined size by considering a generation place of rust inside the road wheel actuator 200, the degree of progress of the rust, and the amount of rust.

Referring to FIG. 6, FIG. 6 represents that in the normal state in which rust is not generated in the electric assembly 230 and the sensor assembly 270, when the motor torque data is close to "0", the ball disposed inside the ball-nut 231 flows by the rotation of the ball-nut 231. In this case, the reference motor torque data may be set to "0" or a numerical value close to "0".

Referring to FIG. 7, FIG. 7 represents that in the state in which rust is generated in the electric assembly 230 and the sensor assembly 270, after the motor torque data passes "0" and reaches ΔT, the ball disposed inside the ball-nut 231 flows. In this case, the predetermined size that is the difference between the motor torque data and the reference motor torque data may be set to ΔT.

The electronic control unit 100 may measure motor torque data (S10) and compare the measured motor torque data with stored reference motor torque data (S11), and when a difference between the motor torque data and the reference motor torque data is equal to or larger than ΔT (S12), the electronic control unit 100 may display an error of the road wheel actuator 200 (S13).

That is, the electronic control unit 100 may measure motor torque data (S10) and compare the measured motor torque data with input and reference motor torque data (S11), and when a value of ΔT is equal to or larger than a predetermined size (S12), the electronic control unit 100 may consider that rust is generated in the electric assembly 230 and/or the sensor assembly 270, and display an error of the road wheel actuator 200 (S13).

Referring to FIG. 8, FIG. 8 illustratively represents the case where the motor torque data (load value) according to displacement is measured larger than the reference motor torque data (load value). Even in the case where the electronic control unit 100 measures the motor torque data (load value) according to the displacement, it is possible to display an error of the road wheel actuator 200 by the process illustrated in FIG. 5.

The steering device for detecting the error of the road wheel actuator 200 according to the exemplary embodiment of the present disclosure may further include the display unit 300.

The display unit 300 may be a notification light (or warning light) disposed on a dashboard of the vehicle, or a notification sound (or warning sound).

The display unit 300 may be electrically connected with the electronic control unit 100.

The electronic control unit 100 may display the error of the road wheel actuator 200 by turning on the notification light of the display unit 300 or generating the notification sound.

The error of the road wheel actuator 200 displayed on the display unit 300 indicates that rust is generated in the electric assembly 230 and/or the sensor assembly 270.

Depending on the use environment of the road wheel actuator 200, a phenomenon in which the belt 234 of the electric assembly 230 is skipped may occur. The phenomenon in which the belt 234 of the electric assembly 230 is skipped may prevent the steering of the vehicle from reaching a steering range desired by the driver, and in severe cases, the phenomenon may make it impossible to steer the vehicle.

When the phenomenon in which the belt 234 of the electric assembly 230 is skipped occurs, the rotation number of the motor 232 increases. Herein, the rotation number of the motor 232 means the number of times of the rotation of the rotation shaft of the motor 232.

In the case where the user rotates the steering wheel completely in one direction and then rotates the steering wheel completely in the opposite direction to the one direction (the user rotates the steering wheel until lock-to-lock), when the phenomenon in which the belt 234 is skipped occurs, the number of times of the rotation of the pinion gear 272 rotating on the rack gear 213 increases. For example, when the pinion gear 272 rotates 3.1 on the rack gear 213 in the case where the skip of the belt 234 does not occur, in the case where the skip of the belt 234 occurs, the pinion gear 272 rotates 202 on the rack gear 213. This is equally applied to the description of the case where the rotation number of the motor 232 increases.

Accordingly, when the data of the road wheel actuator 200 is measured, it is possible to detect an error of the road wheel actuator 200. Herein, the data of the road wheel actuator 200 may be the motor rotation number data representing the rotation number of the motor 232.

In the steering device for detecting the error of the road wheel actuator 200 according to the exemplary embodiments of the present disclosure, when the vehicle starts, the electronic control unit 100 may rotate the steering wheel in one direction or an opposite direction to the one direction by driving the road wheel actuator 200, and in this case, the electronic control unit 100 may measure data of the road wheel actuator 200.

In particular, when the vehicle starts, the electronic control unit 100 may drive the motor 232 of the road wheel actuator 200 by using the input and stored software, and measure the motor rotation number data that is the rotation number of the motor 232.

The method of measuring, by the electronic control unit 100, the motor rotation number data may be the method of measuring the rotation number of the motor 232 by mounting an angle sensor to the rotation shaft of the motor 232.

Depending on an exemplary embodiment, the electronic control unit 100 may measure the rotation number of the pinion shaft 271 by using the angle sensor mounted to the pinion shaft 271, and measure rotation number data of the pinion shaft 271.

Figure 9:
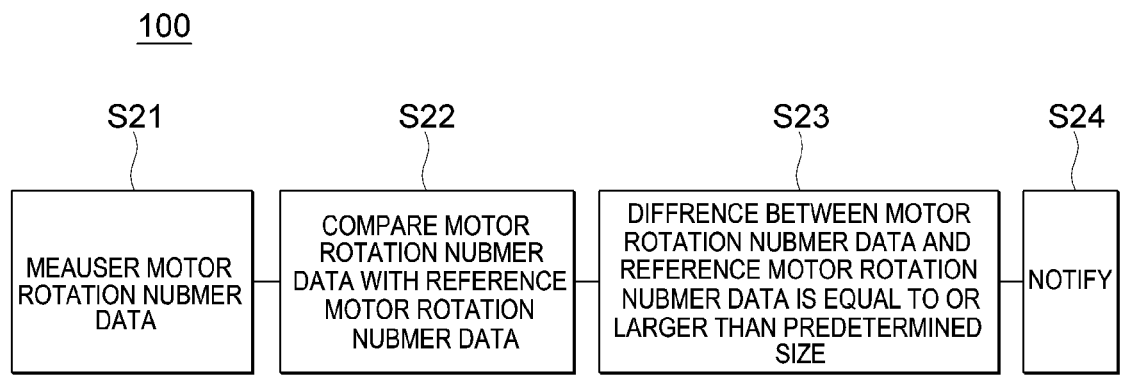
FIG. 9 is a diagram illustrating a flow of measuring, by the electronic control unit, motor rotation number data and detecting an error of the road wheel actuator.

FIG. 9 is a diagram illustrating a flow of measuring, by the electronic control unit, motor rotation number data and detecting an error of the road wheel actuator 200.

Referring to FIG. 9, the electronic control unit 100 may measure motor rotation number data (S21) and compare the measured motor rotation number data with input and stored reference motor rotation number data (S22), and when the motor rotation number data is larger than the reference motor rotation number data by a predetermined rotation number or more (S23), the electronic control unit 100 may display an error of the road wheel actuator 200 (S24). Herein, the predetermined rotation number may be arbitrarily set by the user. In particular, the user may set the predetermined rotation number by considering the degree and the number of occurrences of the skip of the belt 234.

The display unit 300 may be a notification light (or warning light) disposed on a dashboard of the vehicle, or a notification sound (or warning sound). When the skip of the belt 234 occurs in the electric assembly 230, the electronic control unit 100 may display the error of the road wheel actuator 200 by turning on the notification light of the display unit 300 or generating the notification sound (S24). That is, the error of the road wheel actuator 200 displayed on the display unit 300 indicates that the belt 234 of the electric assembly 230 is skipped.

The foregoing contents are equally applied to the case where the electronic control unit 100 measures the rotation number data of the pinion shaft 271, as well as the case where the electronic control unit 100 measures the motor rotation number data.

Hereinafter, the method of determining the error of the road wheel actuator 200 will be described. The content to be described below includes the same content as that described in the steering device for detecting the error of the road wheel actuator 200, and the description of the same content will be omitted.

Figure 10:
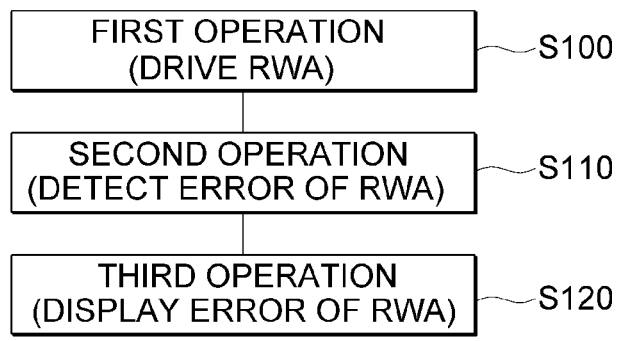
FIG. 10 is a flowchart illustrating a method of determining an error of the road wheel actuator.

FIG. 10 is a flowchart illustrating a method of determining an error of the road wheel actuator.

Referring to FIG. 10, a method of determining an error of the road wheel actuator 200 includes a first operation S100, a second operation S110, and a third operation S120.

In the first operation S100, when the vehicle starts, the electronic control unit 100 rotates the steering wheel in one direction or an opposite direction to the one direction by driving the road wheel actuator 200.

In the second operation S110, the electronic control unit 100 measures data of the road wheel actuator 200 and detects an error of the road wheel actuator 200.

In the third operation S120, when the error is generated in the road wheel actuator 200, the electronic control unit 100 displays the error of the road wheel actuator 200 on the display unit 300.

In the second operation S110, the data of the road wheel actuator 200 may be motor torque data. The electronic control unit 100 may measure motor torque data and compare the measured motor torque data with input reference motor torque data, and when the motor torque data is larger than the reference motor torque data by a predetermined size or more (that is, when a difference between the motor torque data and the reference motor torque data is equal to or larger than the predetermined size), the electronic control unit 100 may detect that the road wheel actuator 200 has an error.

In the third operation S120, the road wheel actuator 200 includes the electric assembly 230 and the sensor assembly 270. The error of the road wheel actuator 200 displayed on the display unit 300 indicates that rust is generated in the electric assembly 230 and/or the sensor assembly 270.

According to another exemplary embodiment, in the second operation S110, the data of the road wheel actuator 200 may be motor rotation number data. The electronic control unit 100 may measure motor rotation number data and compare the measured motor rotation number data with input reference motor rotation number data, and when the motor rotation number data is larger than the reference motor rotation number data by a predetermined rotation number or more, the electronic control unit 100 may detect that the road wheel actuator 200 has an error. Further, in the third operation S120, the road wheel actuator 200 includes the electric assembly 230. The error of the road wheel actuator 200 displayed on the display unit 300 indicates that the belt 234 of the electric assembly 230 is skipped.

The steering device for detecting the error of the road wheel actuator 200 and the method of determining the error of the road wheel actuator 200 according to the exemplary embodiments of the present disclosure may detect the error of the road wheel actuator 200, that is, whether rust is generated in the road wheel actuator 200, and whether the belt 234 of the electric assembly 230 is skipped.

The user may periodically perform a performance test of the road wheel actuator 200. Accordingly, it is possible to detect the error of the road wheel actuator 200 before the steering of the vehicle is impossible, thereby minimizing human and material damage that may occur due to inability to steer.

The characteristic, structure, effect, and the like described in the exemplary embodiments are included in at least one exemplary embodiment of the present disclosure, and are not essentially limited to only one exemplary embodiment. Further, the characteristic, structure, effect, and the like described in each exemplary embodiment may be carried out in other exemplary embodiments through combination or modification by those skilled in the art to which the exemplary embodiments pertain. Accordingly, it shall be construed that contents relating to the combination and the modification are included in the scope of the present disclosure.

Although the exemplary embodiments have been described above, these are only examples, and do not limit the present disclosure, and those skilled in the art will know that various modifications and applications which are not exemplified above are possible within the scope without departing from the essential characteristics of the present exemplary embodiment. Each constituent element specifically presented in the exemplary embodiment may be modified and implemented. Further, it should be interpreted that the differences in relation to the modification and the application are included in the scope of the present disclosure defined in the accompanying claims.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A steering device comprising:
   an electronic control unit electrically connected with a steering wheel of a vehicle;
   a road wheel actuator electrically connected with the electronic control unit; and
   a display unit electrically connected with the electronic control unit,
   wherein
   when the vehicle starts, the electronic control unit rotates the steering wheel in one direction or an opposite direction to the one direction by driving the road wheel actuator and measures data of the road wheel actuator to detect an error of the road wheel actuator,
   the data of the road wheel actuator includes motor torque data,
   the electronic control unit measures the motor torque data and compares the measured motor torque data with an input reference motor torque data,
   when the motor torque data is larger than the reference motor torque data by a predetermined size or more, the electronic control unit displays a first error of the road wheel actuator on the display unit,
   the road wheel actuator includes an electric assembly and a sensor assembly, and
   the first error of the road wheel actuator displayed on the display unit indicates that rust is generated in the electric assembly and the sensor assembly.

2. The steering device of claim 1, wherein
   the data of the road wheel actuator includes motor rotation number data, and the electronic control unit measures the motor rotation number data, and compares the measured motor rotation number data with an input reference motor rotation number data.

3. The steering device of claim 2,
wherein when the motor rotation number data is larger than the reference motor rotation number data by a predetermined rotation number or more, the electronic control unit displays a second error of the road wheel actuator on the display unit.

4. The steering device of claim 3, wherein
the second error of the road wheel actuator displayed on the display unit indicates that a belt of the electric assembly is skipped.

5. A method of determining an error of a road wheel actuator, the method comprising:
- a first operation in which when a vehicle starts, an electronic control unit rotates a steering wheel in one direction or an opposite direction to the one direction by driving the road wheel actuator;
- a second operation in which the electronic control unit measures data of the road wheel actuator and detects a first error of the road wheel actuator; and
- a third operation in which when the first error occurs in the road wheel actuator, the electronic control unit displays the first error of the road wheel actuator on a display unit, wherein
in the second operation, the data of the road wheel actuator includes motor torque data,
the electronic control unit measures the motor torque data and compares the measured motor torque data with an input reference motor torque data,
when the motor torque data is larger than the reference motor torque data by a predetermined size or more, the electronic control unit detects that the road wheel actuator has the first error,
in the third operation, the road wheel actuator includes an electric assembly and a sensor assembly, and
the first error of the road wheel actuator displayed on the display unit indicates that rust is generated in the electric assembly and the sensor assembly.

6. The method of claim 5, wherein
in the second operation, the data of the road wheel actuator includes motor rotation number data,
the electronic control unit measures the motor rotation number data, and compares the measured motor rotation number data with an input reference motor rotation number data, and
when the motor rotation number data is larger than the reference motor rotation number data by a predetermined rotation number or more, the electronic control unit detects that the road wheel actuator has a second error.

7. The method of claim 6, wherein
the second error of the road wheel actuator displayed on the display unit indicates that a belt of the electric assembly is skipped.

* * * * *